(12) United States Patent
Akahira et al.

(10) Patent No.: US 10,179,849 B2
(45) Date of Patent: Jan. 15, 2019

(54) POLYESTER RESIN COMPOSITION AND METHOD FOR PRODUCING THE SAME

(71) Applicant: TORAY INDUSTRIES, INC., Tokyo (JP)

(72) Inventors: Masato Akahira, Nagoya (JP); Ken Sudo, Nagoya (JP); Eri Yasutake, Nagoya (JP); Koya Kato, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/500,989

(22) PCT Filed: Oct. 29, 2015

(86) PCT No.: PCT/JP2015/005435
§ 371 (c)(1),
(2) Date: Feb. 1, 2017

(87) PCT Pub. No.: WO2016/067618
PCT Pub. Date: May 6, 2016

(65) Prior Publication Data
US 2017/0218178 A1 Aug. 3, 2017

(30) Foreign Application Priority Data

Oct. 31, 2014 (JP) ................. 2014-222656
May 22, 2015 (JP) ................. 2015-104476

(51) Int. Cl.
| | | |
|---|---|---|
| C08K 5/34 | (2006.01) | |
| C08K 3/00 | (2018.01) | |
| C08G 63/78 | (2006.01) | |
| C08L 67/02 | (2006.01) | |
| C08K 5/17 | (2006.01) | |
| C08K 3/16 | (2006.01) | |
| C08K 5/3437 | (2006.01) | |
| C08G 63/183 | (2006.01) | |
| C08K 5/098 | (2006.01) | |
| C08K 5/3432 | (2006.01) | |

(52) U.S. Cl.
CPC .......... *C08K 5/3437* (2013.01); *C08G 63/183* (2013.01); *C08G 63/78* (2013.01); *C08K 3/00* (2013.01); *C08K 3/16* (2013.01); *C08K 5/098* (2013.01); *C08K 5/17* (2013.01); *C08K 5/34* (2013.01); *C08K 5/3432* (2013.01); *C08L 67/02* (2013.01)

(58) Field of Classification Search
CPC ........ C08K 5/3437; C08K 5/098; C08K 5/17; C08K 5/34; C08K 5/3432; C08G 63/78; C08L 67/02
USPC ........................................... 524/89
See application file for complete search history.

(56) References Cited

U.S. PATENT DOCUMENTS

| | | | |
|---|---|---|---|
| 3,446,766 A | 5/1969 | Taylor | |
| 2009/0234053 A1* | 9/2009 | Ergungor | ................ C08L 67/02 524/176 |
| 2016/0152754 A1* | 6/2016 | Pfeil | .................... C08K 5/3435 524/99 |

FOREIGN PATENT DOCUMENTS

| | | |
|---|---|---|
| CN | 101970575 A | 2/2011 |
| EP | 2 824 155 A1 | 1/2015 |
| JP | 40-1841 B1 | 2/1965 |
| JP | 401841 B1 * | 2/1965 |
| JP | 52-1000 A | 1/1977 |
| JP | 521000 A * | 1/1977 |
| JP | 64-1763 A | 1/1989 |
| JP | 64001763 A * | 1/1989 |
| JP | 2002-226585 A | 8/2002 |
| JP | 2010-202837 A | 9/2010 |

* cited by examiner

*Primary Examiner* — Michael Bernshteyn
(74) *Attorney, Agent, or Firm* — Birch, Stewart, Kolasch & Birch LLP

(57) ABSTRACT

A polyester resin composition having excellent hydrolysis resistance and excellent transparency and a method of producing the same are provided. There is provided a polyester resin composition comprising a polyester resin that is obtained from a dicarboxylic acid or an ester-forming derivative thereof and a diol as main raw material; and a copper-containing compound and a chelate ligand compound having a nitrogen-containing heterocyclic structure or a tertiary amine structure that are mixed with the polyester resin.

14 Claims, No Drawings

POLYESTER RESIN COMPOSITION AND METHOD FOR PRODUCING THE SAME

TECHNICAL FIELD

The present application claims priority from Japanese Patent Application No. 2014-222656 filed on Oct. 31, 2014 and Japanese Patent Application No. 2015-104476 filed on May 22, 2015, the entirety of disclosures of which is hereby incorporated by reference into this application.

The present invention relates to a polyester resin composition and a method of producing the same.

RELATED ART

A polyester resin has excellent mechanical strength, excellent chemical stability and excellent transparency and is also inexpensive. The polyester resin is accordingly one of synthetic resins most widely used in the world, for example, for fibers, bottles, films, sheets and containers.

The polyester resin has a problem that a terminal acidic carboxyl group serves as a catalyst to accelerate hydrolysis of the ester bonding. For example, addition of a copper compound to exert the effect of reducing the acid value by decarboxylation may be proposed as means to improve the hydrolysis resistance of the polyester resin.

Patent Literature 1 discloses a polyester film produced by adding a copper compound and describes that addition of the copper compound reduces the acid value and improves the hydrolysis resistance.

Patent Literature 2 discloses a polyester film produced by adding a copper compound and an alkali metal halide and describes that addition of the copper compound and the alkali metal halide reduces the acid value and improves the hydrolysis resistance.

Additionally, Patent Literature 3 describes that the combined use of a ligand and a metal serving as a polyester polymerization catalyst such as an alkali metal, an alkaline earth metal, antimony or germanium suppresses deterioration of a polyester resin in melt retention and that the ligand used is a nitrogen-containing compound having a tertiary amine structure.

CITATION LIST

Patent Literature

Patent Literature 1: JP 2010-202837A
Patent Literature 2: U.S. Pat. No. 3,446,766
Patent Literature 3: JP 2002-226685A

SUMMARY

Technical Problem

With respect to Patent Literature 1, the effect of reducing the acid value of polyester is not increased with an increase in the mixing amount of the copper compound. There is also a problem that increasing the mixing amount of the copper compound increases the haze.

The alkali metal halide described in Patent Literature 2 is degraded to cause volatilization of halogen. Accordingly there is an environmental problem.

Additionally, the combination of the metal and the ligand described in Patent Literature 3 fails to provide the effect of reducing the acid value.

An object of the invention is thus to provide a polyester resin having excellent hydrolysis resistance and excellent transparency and a method of producing the same.

Solution to Problem

As the result of intensive study in order to solve the above problems, the inventors have found that the combined use of a copper-containing compound and a compound having a nitrogen-containing heterocyclic structure or a tertiary amine structure provides a polyester resin composition having excellent hydrolysis resistance and excellent transparency, and have achieved the invention.

The invention may be implemented by the following aspects.

(1) A polyester resin composition, comprising:
a polyester resin that is obtained from a dicarboxylic acid or an ester-forming derivative thereof and a diol as main raw material; and
a copper-containing compound and a nitrogen-containing compound having a nitrogen-containing heterocyclic structure or a tertiary amine structure that are mixed with the polyester resin.

(2) The polyester resin composition according to (1), wherein 0.001 to 10 mmol of the copper-containing compound is mixed on a copper atom basis relative to 100 g of the polyester resin (3) The polyester resin composition according to either (1) or (2),
wherein 0.001 to 10 mmol of the nitrogen-containing compound is mixed relative to 100 g of the polyester resin.

(4) The polyester resin composition according to any one of (1) to (3),
wherein the nitrogen-containing compound is mixed with copper atom of the copper-containing compound at a molar ratio (the nitrogen-containing compound/copper atom of the copper-containing compound) of 0.001 to 4.

(5) The polyester resin composition according to any one of (1) to (4),
wherein the copper-containing compound is at least one selected from the group consisting of an organic copper salt, an inorganic copper salt, a copper halide, a copper oxide and a copper hydroxide.

(6) The polyester resin composition according to any one of (1) to (5),
wherein the nitrogen-containing compound comprises a nitrogen-containing chelate ligand.

(7) The polyester resin composition according to (6),
wherein the nitrogen-containing chelate ligand is any of a compound having a partial structure of 2,2'-bipyridyl, a compound having a partial structure of 1,10-phenanthroline and a compound having a partial structure of N,N,N',N'-tetramethylethylenediamine.

(8) The polyester resin composition according to (7),
wherein the nitrogen-containing chelate ligand is either of 2,2'-bipyridyl and 1,10-phenanthrorine.

(9) The polyester resin composition according to any one of (1) to (8),
wherein the polyester resin is at least one selected from the group consisting of polyethylene terephthalate, polypropylene terephthalate, polybutylene terephthalate and polyethylene naphthalate.

(10) The polyester resin composition according to any one of (1) to (9),
wherein the polyester resin has a number-average molecular weight of 5000 to 100000.

(11) The polyester resin composition according to any one of (1) to (10),
wherein the polyester resin has an acid value of not higher than 13 eq/t.

(12) The polyester resin composition according to any one of (1) to (11),
wherein a polyester solution obtained by dissolving 2 g of the polyester resin composition in 20 ml of a 3/2 (volume ratio) mixed solution of phenol/1,1,2,2-tetrachloroethane has a haze of not higher than 2.5% that is measured by using a cell having an optical path of 20 mm.

(13) A method of producing a polyester resin composition, the method comprising:

in a process of producing a polyester resin by performing esterification or transesterification of a dicarboxylic acid or an ester-forming derivative thereof and a diol and subsequently performing polycondensation, mixing a copper-containing compound and a nitrogen-containing compound having a nitrogen-containing heterocyclic structure or a tertiary amine structure in any process of the esterification, the transesterification and the polycondensation.

(14) The method of producing the polyester resin composition according to (13), the method mixing 0.001 to 10 mmol of the copper-containing compound on a copper atom basis relative to 100 g of the obtained polyester resin.

(15) The method of producing the polyester resin composition according to either (13) or (14), the method mixing 0.001 to 10 mmol of the nitrogen containing compound relative to 100 g of the obtained polyester resin.

(16) The method of producing the polyester resin composition according to any one of (13) to (15), the method mixing the nitrogen-containing compound with copper atom included in the copper-containing compound at a molar ratio of 0.001 to 4.

(17) A polyester resin composition, comprising:

a polyester resin formed from a dicarboxylic acid and/or an ester-forming derivative thereof and a diol as main raw material;

a copper-containing compound; and a nitrogen-containing compound having at least one of a nitrogen-containing heterocyclic structure and a tertiary amine structure.

Advantageous Effects of Invention

The above aspects of the invention provide the polyester resin composition having excellent hydrolysis resistance and excellent transparency.

DESCRIPTION OF EMBODIMENTS

According to an embodiment of the invention, there is provided a polyester resin composition comprising a polyester resin that is obtained from a dicarboxylic acid or an ester-forming derivative thereof and a diol as main raw material; and a copper-containing compound and a nitrogen-containing compound having a nitrogen-containing heterocyclic structure or a tertiary amine structure that are mixed with the polyester resin.

(1) Polyester Resin

The polyester resin used according to the embodiment of the invention is obtained by polycondensation of a dicarboxylic acid or an ester-forming derivative thereof and a diol as main raw material. The main raw material herein means that the total structural unit of the dicarboxylic acid or the ester-forming derivative thereof and the diol in the polymer is equal to or higher than 80 mol %. The total structural unit is more preferably equal to or higher than 90 mol %, is furthermore preferably equal to or higher than 95 mol % and is most preferably equal to or higher than 100 mol %.

The dicarboxylic acid or the ester-forming derivative thereof is not specifically limited but may include, for example, aromatic dicarboxylic acids such as terephthalic acid, isophthalic acid, 2,6-naphthalene dicarboxylic acid, diphenyl-4,4'-dicarboxylic acid, diphenyl ether-4,4'-dicarboxylic acid, diphenyl thioether-4,4'-dicarboxylic acid, 5-tetrabutylphosphoniumisophthalic acid and 5-sodiumsulfoisophthalic acid; aliphatic dicarboxylic acids such as oxalic acid, malonic acid, succinic acid, glutaric acid, adipic acid, pimelic acid, suberic acid, sebacic acid, azelaic acid, undecanedioic acid and dodecanedioic acid; and ester-forming derivatives thereof.

The ester-forming derivative herein may include, for example, lower alkyl esters, acid anhydrides and acid halides of the dicarboxylic acids described above. For example, methyl esters, ethyl esters, hydroxyethyl esters and hydroxybutyl esters of the dicarboxylic acids are preferably used as the lower alkyl ester of the dicarboxylic acid. For example, anhydrides of dicarboxylic acids and anhydrides of dicarboxylic acids and acetic acid are preferably used as the acid anhydride of the dicarboxylic acid. For example, acid chlorides, acid bromides and acid iodides are preferably used as the halide of the dicarboxylic acid.

As the dicarboxylic acid or the ester-forming derivative thereof used according to the embodiment of the invention, the aromatic dicarboxylic acid or the ester-forming derivative thereof is preferable, in terms of providing a polyester resin having excellent heat resistance. Terephthalic acid, 2,6-naphthalene dicarboxylic acid or the ester-forming derivative thereof is more preferable as the aromatic dicarboxylic acid or the ester-forming derivative thereof.

The diol used according to the embodiment of the invention may include, for example, ethylene glycol, 1,3-propanediol, neopentyl glycol, 1,4-butanediol, 1,5-pentanediol, 1,6-hexanediol, decamethylene glycol, 2,2,4,4-tetramethyl-1,3-cyclobutanediol, cyclohexanedimethanol, xylylene glycol, polyethylene glycol, polypropylene glycol, polytetramethylene glycol and bisphenol A-ethylene oxide adduct. Among them, ethylene glycol, 1,3-propanediol and 1,4-butanediol are more preferable, in terms of providing a polyester resin having excellent heat resistance.

With regard to any of the dicarboxylic acid, the ester-forming derivative of the dicarboxylic acid and the diol, a single compound may be used alone, or two or more different compounds may be used in combination. The polyester resin used according to the invention may include, for example, polyethylene terephthalate, polypropylene terephthalate, polybutylene terephthalate, polycyclohexane dimethylene terephthalate, polyethylene isophthalate, polypropylene isophthalate, polybutylene isophthalate, polycyclohexane dimethylene isophthalate, polyethylene naphthalate, polypropylene naphthalate, polybutylene naphthalate, polycyclohexane dimethylene terephthalate/polyethylene terephthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polyethylene terephthalate/5-sodium sulfoisophthalate, polypropylene terephthalate/5-sodium sulfoisophthalate, and polybutylene terephthalate/5-sodium sulfoisophthalate. The sign "/" herein represents copolymer. Among them, polyethylene terephthalate, polybutylene terephthalate, polypropylene terephthalate and polyethylene naphthalate are preferable. In terms of providing the high heat resistance, polyethylene terephthalate, polypropylene terephthalate and polybutylene terephthalate are more preferable.

The polyester resin used according to the embodiment of the invention preferably has a number-average molecular weight of 5,000 to 100,000. The number-average molecular weight is more preferably 7,000 to 80,000 and is furthermore preferably 9,000 to 50,000. The number-average molecular weight of greater than 5,000 is likely to provide high mechanical strength. The number-average molecular weight of not greater than 100,000 is, on the other hand, likely to facilitate melt processing. The number-average molecular weight may be determined by gel permeation chromatography.

(2) Copper-Containing Compound

According to the embodiment of the invention, it is important to add a copper-containing compound in the process of producing the polyester resin. It is expected that formation of a copper complex from this copper-containing compound and a nitrogen-containing compound described later provides the advantageous effects of the invention.

The valence of copper included in the copper-containing compound that is to be mixed with the polyester resin according to the embodiment of the invention may be any of zero valence, monovalence and divalence. In terms of providing the high dispersibility into the polyester resin and the high effect of reducing the acid value, the valence of copper is preferably monovalence or divalence.

The copper-containing compound to be mixed with the polyester resin is not specifically limited but is preferably a copper salt. The copper salt is not specifically limited but may include, for example, organic copper salts such as copper formate, copper acetate, copper propionate, copper butyrate, copper valerate, copper caproate, copper enanthate, copper caprylate, copper pelargonate, copper caprate, copper undecylate, copper laurate, copper tridecylate, copper myristate, copper pentadecylate, copper palmitate, copper margarate, copper stearate, copper nonadecylate, copper arachidate, copper heneicosanoate, copper behenate, copper tricosanoate, copper lignocerate, copper cerotate, copper montanate, copper melissate, copper benzoate, copper oxalate, copper malonate, copper succinate, copper terephthalate, copper isophthalate, copper phthalate, copper salicylate, copper citrate and copper tartrate; inorganic copper salts such as copper sulfate, copper carbonate and copper nitrate; copper halides such as copper iodide, copper bromide and copper chloride; hydroxides of copper such as copper hydroxide; and oxides of copper such as copper oxide. The valence of copper in any of these copper salts may be monovalence or divalence. Two or more of these copper salts may be used in combination. Any of these copper salts may be provided in the form of a hydrate. In terms of providing the high effect of reducing the acid value, copper halides are preferable, and copper iodide is especially preferable. In terms of providing the high transparency of the resulting polyester resin composition, copper sulfate is preferable.

According to the embodiment of the invention, the mixing amount of the copper-containing compound is preferably not less than 0.001 mmol on the copper atom basis relative to 100 g of the polyester resin. Mixing 0.001 mmol or more of the copper-containing compound on the copper atom basis relative to 100 g of the polyester resin increases the effect of reducing the acid value. The mixing amount of the copper-containing compound is more preferably not less than 0.005 mmol and is furthermore preferably not less than 0.01 mmol on the copper atom basis relative to 100 g of the polyester resin. The mixing amount of the copper-containing compound is also preferably not greater than 10 mmol on the copper atom basis relative to 100 g of the polyester resin. Mixing 10 mmol or less of the copper-containing compound on the copper atom basis relative to 100 g of the polyester resin advantageously suppresses reduction of the transparency and deterioration of the color tone. The mixing amount of the copper-containing compound is more preferably not greater than 0.5 mmol, is furthermore preferably not greater than 0.15 mmol and is most preferably not greater than 0.045 mmol on the copper atom basis relative to 100 g of the polyester resin. When the copper-containing compound is mixed in the process of polycondensation of the polyester resin, the mixing amount of the copper-containing compound may be calculated on the basis of a theoretical amount of polymer on the assumption that the raw material is fully subjected to polycondensation.

When the copper-containing compound is mixed with the molten polyester resin, a component other than copper atom in the copper-containing compound is likely to be volatilized. Copper atom is, however, not volatilized, so that the content of copper atom in the resulting polyester resin composition including the copper-containing compound is basically equal to the supply amount of copper atom. The content of copper atom may be quantitatively determined by atomic absorption spectrometry or X-ray fluorescence spectroscopy.

(3) Nitrogen-Containing Compound Having Nitrogen-Containing Heterocyclic Structure or Tertiary Amine Structure As is known, mixing the copper-containing compound described above is expected to provide the effect of reducing the acid value and the effect of improving the hydrolysis resistance of the polyester resin. Mixing the copper-containing compound alone is, however, likely to provide the low decarboxylation activity, and even increasing the mixing amount of the copper-containing compound is likely to provide only the insufficient effect of reducing the acid value and the insufficient effect of improving the hydrolysis resistance of the polyester resin. According to the invention, it has been found that formation of a copper complex by further mixing a nitrogen-containing compound that has a nitrogen-containing heterocyclic structure or a tertiary amine structure and has the capability of coordination to copper enhances the decarboxylation activity and improves the dispersibility into the polyester resin. As a result, the inventors have succeeded in reducing the acid value of the polyester resin and thereby providing the polyester resin having excellent hydrolysis resistance and excellent transparency.

The nitrogen-containing compound having the nitrogen-containing heterocyclic structure or the tertiary amine structure is not specifically limited. Examples of the compound having the nitrogen-containing heterocyclic structure include N-methylpyrrolidine, N-methylpiperidine, pyridine, pyrazine, quinoline, isoquinoline, 2,2'-bipyridyl, terpyridine, 1,10-phenanthroline, 1,8-naphthyridine, nicotinic acid, isonicotinic acid, and derivatives having partial structures of these compounds. Examples of the compound having the tertiary amine structure include N,N,N',N'-tetramethylethylenediamine, N,N,N',N'',N''-pentamethyldiethylenetriamine, N-methylpyrrolidine, N-methylpiperidine, and derivatives having partial structures of these compounds. Any of these nitrogen-containing compounds having the nitrogen-containing heterocyclic structure or the tertiary amine structure may be provided in the form of a hydrate. The nitrogen-containing compound may be a compound in which nitrogen constituting a heterocycle also constitutes a tertiary amine. In other words, the nitrogen-containing compound may have both the nitrogen-containing heterocyclic structure and the tertiary amine structure.

A nitrogen-containing compound that serves as a chelate ligand to form a stable copper complex (also called "nitrogen-containing chelate ligand") is preferable as the nitrogen-containing compound having the nitrogen-containing heterocyclic structure or the tertiary amine structure. Concrete examples of the nitrogen-containing compound that serves as the nitrogen-containing chelate ligand to form the stable copper complex include N,N,N',N'-tetramethylethylenediamine, N,N,N',N'',N''-pentamethyldiethylenetriamine, 2,2'-bipyridyl, terpyridine, 1,10-phenanthroline, 1,8-naphthyridine, and derivatives having partial structures of these compounds. As the nitrogen-containing compound having the nitrogen-containing heterocyclic structure or the tertiary amine structure, more preferable are N,N,N',N'-tetramethylethylenediamine, 2,2'-bipyridyl, 1,10-phenanthroline and 1,8-naphthyridine that serve as a nitrogen-containing bidentate chelate ligand, as well as derivatives having partial structures of these compounds. Furthermore preferable are 2,2'-bipyridyl and 1,10-phenanthroline. The nitrogen-containing chelate ligand herein denotes a compound having a plurality of coordination positions including at least one nitrogen atom in the molecule and more specifically denotes a compound having a plurality of coordination positions arranged to allow for simultaneous coordination to one metal atom. The nitrogen-containing bidentate chelate ligand herein denotes a compound having two or more coordination positions including a nitrogen atom in the molecule or more specifically denotes a compound having two coordination positions including a nitrogen atom, among the two or more coordination positions, arranged to allow for simultaneous coordination to one metal atom. When one of the coordination positions is nitrogen atom, another coordination position may be oxygen atom or sulfur atom. According to the embodiment of the invention, the nitrogen-containing bidentate chelate ligand or a nitrogen-containing tridentate chelate ligand are preferable, and the nitrogen-containing bidentate chelate ligand is especially preferable.

According to the embodiment of the invention, the mixing amount of the nitrogen-containing compound having the nitrogen-containing heterocyclic structure or the tertiary amine structure is preferably not less than 0.001 mmol relative to 100 g of the polyester resin. Mixing 0.001 mmol or more of the nitrogen-containing compound relative to 100 g of the polyester resin provides the large effect of reducing the acid value of the polyester resin and also exerts the effect of improving the transparency of the polyester resin. The mixing amount of the nitrogen-containing compound is more preferably not less than 0.005 mmol and is furthermore preferably not less than 0.01 mmol relative to 100 g of the polyester resin. The mixing amount of the nitrogen-containing compound is also preferably not greater than 10 mmol relative to 100 g of the polyester resin. Mixing 10 mmol or less of the nitrogen-containing compound relative to 100 g of the polyester resin desirably does not accelerate the hydrolysis. The mixing amount of the nitrogen-containing compound is more preferably not greater than 0.5 mmol and is furthermore preferably not greater than 0.2 mmol relative to 100 g of the polyester resin. The content of the compound having the nitrogen-containing heterocyclic structure or the tertiary amine structure may be quantitatively determined by NMR or by, for example, HPLC or GC of the nitrogen-containing compound extracted from a hydrolysate of the polyester resin.

According to the invention, the combined use of the nitrogen-containing compound having the nitrogen-containing heterocyclic structure or the tertiary amine structure with the copper-containing compound sufficiently reduces the acid value even when only a small amount of the copper-containing compound is used. This is also advantageous in terms of ensuring the transparency of the polyester resin.

When the polyester resin composition of the invention is obtained by adding the compound having the nitrogen-containing heterocyclic structure or the tertiary amine structure in the course of polycondensation of the polyester resin, the mixing amount of the compound having the nitrogen-containing heterocyclic structure or the tertiary amine structure may be calculated on the basis of a theoretical amount of the polymer on the assumption that the raw material is fully polycondensated.

(4) Mixing Ratio

According to the embodiment of the invention, in order to reduce the acid value efficiently, it is preferable to mix the nitrogen-containing compound having the nitrogen-containing heterocyclic structure or the tertiary amine structure with the polyester resin at a molar ratio (nitrogen-containing compound/copper atom of copper-containing compound) of 0.001 to 4 on the copper atom basis of the copper-containing compound. The molar ratio (nitrogen-containing compound/copper atom of copper-containing compound) is more preferably not lower than 0.01, is furthermore preferably not lower than 0.1 and is most preferably not lower than 0.4. The molar ratio (nitrogen-containing compound/copper atom of copper-containing compound) is also more preferably not greater than 2, is furthermore preferably not greater than 1 and is most preferably not greater than 0.4. The molar ratio (nitrogen-containing compound/copper atom of copper-containing compound) of not less than 0.001 advantageously suppresses an increase in haze of the polyester resin composition. The molar ratio (nitrogen-containing compound/copper atom of copper-containing compound) of not greater than 4, on the other hand, advantageously suppresses the hydrolysis of polyester without using an excess of the nitrogen-containing compound having the nitrogen-containing heterocyclic structure or the tertiary amine structure relative to copper.

(5) Method of Producing Polyester Resin Composition

The method of producing the polyester resin that is obtained from the dicarboxylic acid or the ester-forming derivative thereof and the diol as the main raw material and is used according to the embodiment of the invention includes a two-stage process described below. The following describes the case where an alkyl dicarboxylate is used as the ester-forming derivative. The two-stage process include a first-stage process of (A) esterification or (B) transesterification and a subsequent second-stage process of (C) polycondensation.

With regard to the first-stage process, the process of (A) esterification is a process of obtaining a low polycondensate by esterification of the dicarboxylic acid and the diol at a predetermined temperature until distillation of a predetermined amount of water. The process of (B) transesterification is a process of obtaining a low polycondensate by transesterification of the alkyl dicarboxylate and the diol at a predetermined temperature until distillation of a predetermined amount of an alcohol.

With regard to the second-stage process, the process of (C) polycondensation is a process of obtaining a high molecular-weight polyester resin by a reaction of removing the diol that proceeds by heating the low polycondensate obtained by either (A) the esterification or (B) the transesterification under reduced pressure. In general, the temperature of this polycondensation is preferably not lower than 230° C., is more preferably not lower than 250° C. and is most preferably not lower than 280° C. The temperature of this polycondensation is also preferably not higher than 300° C. The temperature of polycondensation of not lower than 230° C. provides the high reaction rate of decarboxylation and thereby tends to provide the high effect of reducing the acid value. The temperature of polycondensation of lower than 300° C. tends to suppress deterioration of the resulting polyester resin. In the case of polycondensation of polyethylene terephthalate, the temperature is preferably 280 to 300° C. and is more preferably 290° C. In the case of polycondensation of polybutylene terephthalate, the temperature is preferably 240 to 260° C. and is more preferably 250 to 260° C.

In the method of producing the polyester resin used according to the embodiment of the invention, a compound of, for example, manganese, cobalt, zinc, titanium or calcium may be used as the catalyst for the esterification, or no catalyst may be used for the esterification. A compound of, for example, magnesium, manganese, calcium, cobalt, zinc, lithium or titanium may be used as the catalyst for the transesterification. A compound of, for example, antimony, titanium, aluminum tin or germanium may be used as the catalyst for the polycondensation.

The antimony compound may be, for example, an antimony oxide, an antimony carboxylate or an antimony alkoxide. Concrete examples of the antimony oxide include antimony trioxide and antimony pentoxide. Concrete examples of the antimony carboxylate include antimony acetate, antimony oxalate and antimony potassium tartrate. Concrete examples of the antimony alkoxide include antimony tri-n-butoxide and antimony triethoxide.

The titanium compound may be, for example, a titanium complex, a titanium alkoxide such as tetraisopropyl titanate, tetra-n-butyl titanate or tetra-n-butyl titanate tetramer, a titanium oxide obtained by hydrolysis of any of these titanium alkoxides, or titanium acetylacetonate.

The aluminum compound may be, for example, an aluminum carboxylate, an aluminum alkoxide, an aluminum chelate compound or a basic aluminum compound. Concrete examples of the aluminum compound include aluminum acetate, aluminum hydroxide, aluminum carbonate, aluminum ethoxide, aluminum isopropoxide, aluminum acetylacetonate and basic aluminum acetate.

Examples of the tin compound include monobutyltin oxide, dibutyltin oxide, methylphenyltin oxide, tetraethyltin oxide, hexaethylditin oxide, triethyltin hydroxide, monobutylhydroxytin oxide, monobutyltin trichloride and dibutyltin sulfide.

The germanium compound may be, for example, a germanium oxide or a germanium alkoxide. Concrete examples of the germanium oxide include germanium dioxide and germanium tetroxide. Concrete examples of the germanium alkoxide include germanium tetraethoxide and germanium tetrabutoxide.

Concrete examples of the magnesium compound include magnesium oxide, magnesium hydroxide, magnesium alkoxide, magnesium acetate and magnesium carbonate.

Concrete examples of the manganese compound include manganese chloride, manganese bromide, manganese nitrate, manganese carbonate, manganese acetylacetonate and manganese acetate.

Concrete examples of the calcium compound include calcium oxide, calcium hydroxide, calcium alkoxide, calcium acetate and calcium carbonate.

Concrete examples of the cobalt compound include cobalt chloride, cobalt nitrate, cobalt carbonate, cobalt acetylacetonate and cobalt naphthenate.

Concrete examples of the zinc compound include zinc oxide, zinc alkoxide and zinc acetate.

Any of these metal compounds may be in the form of a hydrate.

A phosphorus compound may be added as a stabilizer to the polyester resin used according to the embodiment of the invention. For example, phosphoric acid, trimethyl phosphate, triethyl phosphate, ethyl diethylphosphonoacetate, 3,9-bis(2,6-di-tert-butyl-4-methylphenoxy)-2,4,8,10-tetraoxa-3,9-diphosphaspiro[5,5]undecane, and tetrakis(2,4-di-tert-butyl-5-methylphenyl)[1,1-biphenyl]-4,4'-diylbisphosphonite may be used as the stabilizer.

A dye used for the resin or the like may be added as a color modifier as appropriate. More specifically, a blue color modifier such as Solvent Blue 104 or Solvent Blue 45 or a violet color modifier such as Solvent Violet 36 in the Color Index Generic Name is preferable, since these color modifiers have good heat resistance at high temperature and excellent color development. Any of these color modifiers may be used alone, or two or more color modifiers may be used in combination.

An antioxidant, an ultraviolet absorber, a flame retardant, a fluorescent whitening agent, a matting agent, a plasticizer, an antifoaming agent and other additives may be additionally mixed as appropriate.

The method of producing the polyester resin composition according to the embodiment of the invention may be a method of adding the copper-containing compound and the nitrogen-containing compound having the nitrogen-containing heterocyclic structure or the tertiary amine structure in any stage of the process (A) or (B) and the subsequent process (C) described above. In order to produce the polyester resin composition of a high molecular weight with high efficiency, it is preferable to add these compounds in the process (C). The configuration employed to add the polycondensation catalyst, the copper-containing compound, the nitrogen-containing compound having the nitrogen-containing heterocyclic structure or the tertiary amine structure and the other additives may be any of a configuration that individually and separately adds the respective components, a configuration that adds the respective components that are individually dissolved or dispersed in a solvent, and a configuration that adds the components that are premixed in a solvent. In order to reduce the acid value of the polyester resin efficiently, a preferable procedure may add the copper-containing compound and the nitrogen-containing compound having the nitrogen-containing heterocyclic structure or the tertiary amine structure in the form of a copper complex formed by premixing these compounds in a solvent. As a concrete example of adding the polycondensation catalyst, the copper-containing compound, the nitrogen-containing compound having the nitrogen-containing heterocyclic structure or the tertiary amine structure and the other additives in the form of solutions or dispersions, a preferable procedure may use a diol as the solvent and add the respective components that are dissolved or dispersed in the diol at a weight ratio of 1/100 to 20/100.

(6) Polyester Resin Composition

According to the embodiment of the invention, mixing the copper-containing compound and the nitrogen-containing compound as described above gives a polyester resin composition including the polyester resin having the acid value of not higher than 13 eq/t. In terms of further enhancing the hydrolysis resistance, the acid value of the polyester resin is preferably not higher than 10 eq/t, is more preferably not higher than 7 eq/t and is most preferably not higher than 2 eq/t. The acid value of the polyester resin is generally not lower than 0 eq/t. When the total mixing amount of the polycondensation catalyst, the copper-containing compound, the nitrogen-containing compound and the other additives that are mixed with the polyester resin is lower than 1% by weight, the acid value determined by dissolving the polyester resin composition in an ortho-cresol solvent and titrating the solution at 25° C. using a 0.02 N sodium hydroxide aqueous solution is defined as the acid value of the polyester resin.

When the total mixing amount of the polycondensation catalyst, the copper-containing compound, the nitrogen-containing compound and the other additives included in the polyester resin composition is equal to or higher than 1% by weight, the acid value is measured after removal of the additives and the like to decrease the total mixing amount to be lower than 1% by weight.

The acid value of the polyester resin of not higher than 13 eq/t improves the retention rate of the number-average molecular weight of the polyester resin after the polyester resin composition of the invention is treated under the conditions of 121° C. and 100% RH for 24 hours. The retention rate of the number-average molecular weight is preferably not lower than 80% and is especially preferably not lower than 90%. The retention rate of the number-average molecular weight is generally not higher than 100%. The number-average molecular weight may be determined by gel permeation chromatography.

The polyester resin composition according to the embodiment of the invention has excellent transparency. The transparency may be evaluated by measuring the polyester resin composition dissolved in ortho-chlorophenol/1,1,2,2-tetrachloroethane with a haze meter. The haze is preferably not higher than 2.5%, is more preferably not higher than 1.5% and is especially preferably not higher than 1.0%. The haze is generally not lower than 0%. When the total amount of the additives such as filler included in the polyester resin composition is equal to or higher than 1% by weight, the haze is measured after removal of the additives to decrease the total amount to be lower than 1% by weight.

According to the embodiment of the invention, solid phase polymerization may be performed to obtain the polyester resin composition of a higher molecular weight. The equipment or the method employed for the solid phase polymerization is not specifically limited. The solid phase polymerization is performed by heating in an inert gas atmosphere or under reduced pressure. The inert gas may be any gas that is inactive to polyester and may be, for example, nitrogen, argon, helium or carbon dioxide. From the economic standpoint, nitrogen is preferably used. With respect to the reduced pressure condition, the lower pressure is advantageous to shorten the time period required for the solid phase polymerization, but the reduced pressure is preferably kept at or above 110 Pa.

The polyester resin composition of the invention may be produced by batch polymerization, semi-continuous polymerization or continuous polymerization.

The polyester resin composition obtained according to the embodiment of the invention may be molded and processed by a known processing method. The polyester resin composition obtained according to the embodiment of the invention may be processed to a wide variety of products such as fibers, films, bottles and injection molded products.

For example, a general melt spinning—drawing process may be employed to process the polyester resin composition into fiber. More specifically, the polyester resin composition is heated to the melting point of the polyester resin or the higher temperature to be melted, is subsequently ejected from fine holes, and is cooled down and solidified with the cooling air. After addition of an oil solution to the polyester resin composition, undrawn yarn is hauled off by a haul-off roller and is wound up by a winding machine located downstream of the haul-off roller.

The wound-up undrawn yarn is drawn with a pair of or multiple pairs of heated rollers and is eventually subjected to heat treatment under tension or under relaxation. This provides a fiber having physical properties including mechanical properties suitable for its application. The undrawn yarn hauled off in the melt spinning process described above may be continuously subjected to the drawing process without being wound up. Such continuous drawing may be employed in terms of the industrial standpoint, such as the productivity. In this drawing—heat treatment process, the drawing rate, the drawing temperature and the heat treatment conditions may be selected appropriately according to, for example, the target fineness, the target strength, the target degree of elongation and the target degree of shrinkage of the fiber.

A method of processing the polyester resin composition of the invention into film is described concretely. The following describes an example of quenching the polyester resin composition to produce a low-density unstretched film and then stretching the film by successive biaxial stretching, but this example is not restrictive.

The polyester resin composition is heated and dried in vacuum at 180° C. for three or more hours and is subsequently supplied to a single-screw extruder or a twin-screw extruder that is heated at 270 to 320° C. under nitrogen stream or under vacuum. This plasticizes the polymer. The plasticized polyester resin composition is then melt extruded from a slit-like die and is cooled down and solidified on a casting roll. This provides an unstretched film. In this process, it is preferable to use any of various filters, for example, a filter formed from sintered metal, porous ceramic, sand or metal wire, for removal of foreign substances and degraded polymers. A gear pump may be provided to improve the fixed volume supply performance as appropriate. Subsequently the sheet-like film formed as described above is biaxially stretched. More specifically, the sheet-like film formed as described above is biaxially stretched in a longitudinal direction and in a width direction and is then subjected to heat treatment. The stretching method may be, for example, a successive biaxial stretching method of, for example, stretching first in the longitudinal direction and subsequently stretching in the width direction; a simultaneous biaxial stretching method of simultaneously stretching in the longitudinal direction and in the width direction, for example, using a simultaneous biaxial tenter; or a method of combining the successive biaxial stretching method with the simultaneous biaxial stretching method. With a view to controlling the thermal expansion coefficient and the thermal shrinkage rate to the ranges of the invention, the heat treatment after the stretching process is desirably non-excessive and effective heat treatment without causing relaxation of the molecular chain orientation.

One or more of various additives may be added in the course of processing the polyester resin composition according to the embodiment of the invention into a wide variety of products. Examples of the various additives may include coloring agents including pigments and dies, lubricants, antistatic agents, flame retardants, ultraviolet absorbers, antimicrobial agents, nucleating agents, plasticizers and mold release agents.

The polyester resin composition according to the embodiment of the invention has the high hydrolysis resistance and the high transparency and may thus be used for a variety of products such as fibers, films, bottles and injection molded products. These products are effectively used as agricultural materials, horticultural materials, fishery materials, civil engineering and building materials, the stationery, medical products, automobile parts, electric and electronic parts and other applications.

EXAMPLES

The following describes the invention more in detail with reference to examples. The following raw materials and reagents were used in the examples:

dimethyl terephthalate manufactured by SK Chemicals; and ethylene glycol manufactured by NIPPON SHOKUBAI CO., LTD.

1,4-butanediol manufactured by BASF SE magnesium acetate tetrahydrate manufactured by KANTO CHEMICAL CO., INC.

antimony trioxide manufactured by KANTO CHEMICAL CO., INC.

trimethyl phosphate manufactured by KANTO CHEMICAL CO., INC.

copper iodide manufactured by KANTO CHEMICAL CO., INC.

1,10-phenanthroline manufactured by Sigma-Aldrich Corporation copper (I) acetate manufactured by Strem Chemicals Inc.

copper (II) acetate manufactured by KANTO CHEMICAL CO., INC.

copper sulfate pentahydrate manufactured by Sigma-Aldrich Corporation 2,2'-bipyridyl manufactured by KANTO CHEMICAL CO., INC.

N,N,N',N'',N''-pentamethyldiethylenetriamine manufactured by Tokyo Chemical Industry Co., Ltd.

tetra-n-butoxytitanate manufactured by Wako Pure Chemical Industries, Ltd.

The physical properties were measured in the examples by the methods described below.

(1) Number Average Molecular Weight

The number-average molecular weight of the polyester resin included in the polyester resin composition was determined by gel permeation chromatography under the following conditions.

In gel permeation chromatography, a solution of the sample concentration of 1 mg/mL prepared by dissolving the polyester resin composition in hexafluoroisopropanol (with addition of 0.005 N sodium trifluoroacetate) was used for measurement. The measurement conditions are given below:

pump: Waters 515 (manufactured by Waters Corporation)
detector: differential refractometer Waters 410 (manufactured by Waters Corporation)
column: Shodex HFIP-806M (two)+HFIP-LG
solvent: hexafluoroisopropanol (with addition of 0.005 N sodium trifluoroacetate)
flow rate: 1.0 ml/min
injection amount of sample: 0.1 ml
temperature: 30° C.
calibration of molecular weight: poly(methyl methacrylate)

(2) Acid Value (Unit: eq/t)

The polyester resin composition was dissolved in ortho-cresol at a concentration of 30 mg/L. The acid value was determined by titrating this solution with a 0.02 N sodium hydroxide aqueous solution at 25° C. using an automatic titration apparatus (COM-550 manufactured by Hiranuma Sangyo Co., Ltd.)

(3) Hydrolysis Resistance (Retention Rate % of Molecular Weight Under the Condition of 100% Humidity)

Pellets obtained by drying the polyester resin composition in vacuum at 140° C. for 16 hours were pressed at 280° C. to a plate of 1 mm in thickness. The plate was maintained at 121° C. under the high humidity condition of 100% RH for 24 hours using a HAST (highly accelerated stress test) chamber (EHS-411, manufactured by ESPEC CORP.) The retention rate (%) of the number-average molecular weight after the treatment to the number-average molecular weight before the treatment was calculated.

(4) Haze (Unit: %)

Two grams of the polyester resin composition were dissolved in 20 ml of a 3/2 (volume ratio) mixed solution of ortho-chlorophenol/1,1,2,2-tetrachloroethane. The haze was measured by integrating sphere photoelectric photometry using a cell having the optical length of 20 mm with a haze meter (HZ-1 manufactured by Suga Test Instruments Co., Ltd.)

Example 1

A mixture of 100 parts by weight of dimethyl terephthalate, 60 parts by weight of ethylene glycol and 0.06 parts by weight of magnesium acetate tetrahydrate was melted at 150° C. in a nitrogen atmosphere and was heated with stirring to 240° C. in four hours for distillation of methanol. Bis(hydroxyethyl)terephthalate was obtained by subsequent transesterification.

Relative to 100 g as the theoretical amount of the polymer obtained by polycondensation of bis(hydroxyethyl)terephthalate, 0.2 mmol of antimony trioxide, 0.1 mmol of trimethyl phosphate, 0.02 mmol of copper (I) iodide and 0.02 mmol of 1,10-phenanthroline were respectively measured. Ethylene glycol mixtures were prepared by respectively adding 15-fold volumes of ethylene glycol to the respective weights of antimony trioxide and trimethyl phosphate. A mixture of copper (I) iodide, 1,10-phenanthroline and ethylene glycol was prepared by adding a solution obtained by adding a 15-fold volume of ethylene glycol to the weight of 1,10-phenanthroline to a mixture obtained by adding a 15-fold volume of ethylene glycol to the weight of copper (I) iodide.

After bis(hydroxyethyl)terephthalate placed in a test tube was melted at 250° C., the mixture of antimony trioxide and ethylene glycol, the ethylene glycol solution of trimethyl phosphate and the mixture of copper (I) iodide, 1,10-phenanthroline and ethylene glycol respectively prepared as described above were added. The inner temperature of the reaction vessel was gradually increased from 250° C. to 290° C. in 60 minutes, and the inner pressure of the reaction vessel was reduced from ordinary temperature to 130 Pa in 60 minutes. Polycondensation of the mixture was performed at 290° C. and 130 Pa. The torque applied to the stirring rod in the test tube was monitored, and the polycondensation was terminated when the torque reached a predetermined target torque. After termination of the polycondensation, the molten product was ejected into strands. The strands were cooled down and were immediately cut off to provide pellets of a polyester resin composition. The number-average molecular weight, the acid value, the hydrolysis resistance and the haze were measured using the obtained pellets.

The results are shown in Table 1.

Examples 2 to 16 and Comparative Examples 1 to 7

Polyester resin compositions were obtained by the same method as that of Example 1 except changing the type and the mixing amount of the copper-containing compound and/or changing the type and the mixing amount of the nitrogen-containing compound.

TABLE 1

| | | Copper-Containing Compound | | Nitrogen-containing Compound | | | Polycondensation | | Polyester resin composition | | | |
|---|---|---|---|---|---|---|---|---|---|---|---|---|
| | Polyester Resin Type | Type | Amount mixed per 100 g of polymer (copper atom basis) mmol | Type | Amount mixed per 100 g of polymer mmol | Mixing ratio of nitrogen-containing compound to copper atom molar ratio | Temperature ° C. | Time hr:min | Number average molecular weight | Acid value eq/t | Retention rate of number-average molecular weight after 24 hours under conditions of 100% RH at 121° C. % | Haze % |
| EX 1 | PET | CuI | 0.02 | 1,10-phenanthroline | 0.02 | 1 | 290 | 2:30 | 14100 | 1.9 | 90.8 | 0.8 |
| EX 2 | PET | CuOAc | 0.02 | 1,10-phenanthroline | 0.02 | 1 | 290 | 2:25 | 13500 | 2.0 | 90.5 | 0.8 |
| EX 3 | PET | Cu(OAc)$_2$ | 0.02 | 1,10-phenanthroline | 0.02 | 1 | 290 | 2:25 | 14000 | 2.2 | 90.3 | 0.8 |
| EX 4 | PET | CuSO$_4$•5H$_2$O | 0.02 | 1,10-phenanthroline | 0.02 | 1 | 290 | 2:25 | 14000 | 3.0 | 88.2 | 0.5 |

TABLE 1-continued

| | Polyester Resin Type | Copper-Containing Compound Type | Copper-Containing Compound Amount mixed per 100 g of polymer (copper atom basis) mmol | Nitrogen-containing Compound Type | Nitrogen-containing Compound Amount mixed per 100 g of polymer mmol | Mixing ratio of nitrogen-containing compound to copper atom molar ratio | Polycondensation Temperature °C | Polycondensation Time hr:min | Number average molecular weight | Acid value eq/t | Polyester resin composition Retention rate of number-average molecular weight after 24 hours under conditions of 100% RH at 121° C. % | Haze % |
|---|---|---|---|---|---|---|---|---|---|---|---|---|
| EX 5 | PET | CuI | 0.1 | 1,10-phenanthroline | 0.1 | 1 | 290 | 3:40 | 13800 | 1.2 | 91.9 | 0.8 |
| EX 6 | PET | CuI | 0.2 | 1,10-phenanthroline | 0.2 | 1 | 290 | 3:40 | 11000 | 1.0 | 92.0 | 2.3 |
| EX 7 | PET | CuI | 0.1 | 1,10-phenanthroline | 0.01 | 0.1 | 290 | 2:25 | 13600 | 1.3 | 91.5 | 2.0 |
| EX 8 | PET | CuI | 0.1 | 1,10-phenanthroline | 0.04 | 0.4 | 290 | 2:40 | 14000 | 1.1 | 92.0 | 1.6 |
| EX 9 | PET | CuI | 0.1 | 1,10-phenanthroline | 0.08 | 0.8 | 290 | 2:45 | 13800 | 0.9 | 92.5 | 1.2 |
| EX 10 | PET | CuI | 0.1 | 1,10-phenanthroline | 0.2 | 2 | 290 | 2:25 | 14000 | 3.1 | 86.0 | 0.8 |
| EX 11 | PET | CuI | 0.1 | 1,10-phenanthroline | 0.4 | 4 | 290 | 2:25 | 14000 | 5.8 | 80.4 | 0.7 |
| EX 12 | PET | CuI | 0.1 | 1,10-phenanthroline | 0.6 | 6 | 290 | 2:25 | 14000 | 5.8 | 79.5 | 0.6 |
| EX 13 | PET | CuI | 0.1 | 1,10-phenanthroline | 12 | 120 | 290 | 2:25 | 14000 | 5.8 | 79.0 | 0.6 |
| EX 14 | PET | CuI | 0.5 | 2,2'-bipyridyl | 0.5 | 1 | 290 | 2:25 | 13800 | 2.8 | 86.2 | 2.6 |
| EX 15 | PET | CuI | 0.02 | 2,2'-bipyridyl | 0.02 | 1 | 290 | 2:25 | 13500 | 6.0 | 86.2 | 0.8 |
| EX 16 | PET | CuI | 0.02 | N,N,N',N',N'-pentamethyl-diethylenetriamine | 0.02 | 1 | 290 | 2:25 | 13500 | 6.2 | 84.5 | 0.6 |
| COMP EX 1 | PET | CuI | 0.02 | not used | — | — | 290 | 2:25 | 13500 | 20 | 71.0 | 3.8 |
| COMP EX 2 | PET | CuI | 0.5 | not used | — | — | 290 | 2:25 | 14000 | 12 | 78.3 | 8.7 |
| COMP EX 3 | PET | CuI | — | not used | — | — | 290 | 2:25 | 14000 | 20 | 65.3 | 0.5 |
| COMP EX 4 | PET | CuOAc | 0.06 | not used | — | — | 290 | 2:35 | 13600 | 14 | 75.5 | 1.7 |
| COMP EX 5 | PET | Cu(OAc)$_2$ | 0.06 | not used | — | — | 290 | 2:20 | 13600 | 15 | 74.0 | 1.4 |
| COMP EX 6 | PET | CuSO$_4$·5H$_2$O | 0.06 | not used | — | — | 290 | 2:25 | 14000 | 20 | 69.5 | 1.0 |
| COMP EX 7 | PET | not used | — | 1,10-phenanthroline | 0.2 | — | 290 | 2:25 | 14000 | 19 | 62.5 | 0.5 |

Compared with the polyethylene terephthalate resin compositions obtained in Comparative Examples 1 to 7, the polyethylene terephthalate resin compositions obtained in Examples 1 to 16 according to the invention had the better values of hydrolysis resistance and haze. The results of Examples 5, 8 and 9 show that the molar ratio of the nitrogen-containing compound to the copper atom of the copper-containing compound (nitrogen-containing compound/copper atom of copper-containing compound) in the range of 0.4 to 1 provides the low acid value and the further better hydrolysis resistance. Example 4 used copper sulfate and accordingly had the low haze and excellent transparency.

Comparison between Example 1 and Comparative Example 1 shows that the combined use of phenanthroline as the nitrogen-containing compound decreases the haze, with respect to the fixed mixing amount of the copper-containing compound.

Example 17

A mixture of 100 parts by weight of terephthalic acid, 100 parts by weight of 1,4-butanediol and 0.06 parts by weight of tetra-n-butoxytitanate was melted at 100° C. in a nitrogen atmosphere, and esterification of the mixture was started with stirring under reduced pressure of 87 kPa. The mixture was then heated to 230° C. and the esterification was performed at 230° C. The reaction time of the esterification was 240 minutes, and bis(hydroxybutyl)terephthalate was obtained.

Relative to 100 g as the theoretical amount of the polymer obtained by polycondensation of the obtained bis(hydroxybutyl)terephthalate, 0.05 mmol of tetra-n-butoxytitanate, 0.30 mmol of copper (I) iodide and 0.30 mmol of 1,10-phenanthroline were measured respectively. Ethylene glycol mixtures were prepared by respectively adding 15-fold volumes of ethylene glycol to the respective weights of tetra-n-butoxytitanate, copper (I) iodide and 1,10-phenanthroline.

After bis(hydroxybutyl)terephthalate placed in a test tube was melted at 245° C., all the ethylene glycol mixtures of tetra-n-butoxytitanate, copper (I) iodide and 1,10-phenanthroline prepared as described above were added. After the pressure was reduced from ordinary pressure to 80 Pa in 60 minutes, polycondensation of the mixture was performed at 245° C. and 80 Pa. The torque applied to the stirring rod in the test tube was monitored, and the polycondensation was terminated when the torque reached a predetermined target torque. After termination of the polycondensation, the molten product was ejected into strands. The strands were cooled down and were immediately cut off to provide pellets of a polyester resin composition. The number-average molecular weight, the acid value, the hydrolysis resistance and the haze were measured using the obtained pellets. The results are shown in Table 2.

Example 18

A polyester resin composition was obtained by the same method as that of Example 17 except changing the mixing amount of the copper-containing compound and changing the polycondensation temperature from 245° C. to 255° C.

Comparative Example 8

A polyester resin composition was obtained by the same method as that of Example 17 except no addition of the nitrogen-containing compound.

Comparative Example 9

A polyester resin composition was obtained by the same method as that of Example 17 except no addition of copper (I) iodide and the nitrogen-containing compound.

Comparative Example 10

A polyester resin composition was obtained by the same method as that of Example 17 except no addition of copper (I) iodide.

Comparative Example 11

A polyester resin composition was obtained by the same method as that of Comparative Example 9 except changing the polycondensation temperature from 245° C. to 255° C.

TABLE 2

| | | Copper-Containing Compound | | Nitrogen-containing Compound | | | Polycondensation | | | | Polyester resin composition | |
|---|---|---|---|---|---|---|---|---|---|---|---|---|
| | Polyester Resin Type | Type | Amount mixed per 100 g of polymer (copper atom basis) mmol | Type | Amount mixed per 100 g of polymer mmol | Mixing ratio of nitrogen-containing compound to copper atom molar ratio | Temperature ° C. | Time hr:min | Number average molecular weight | Acid value eq/t | Retention rate of number-average molecular weight after 24 hours under conditions of 100% RH at 121° C. % | Haze % |
| EX 17 | PBT | CuI | 0.3 | 1,10-phenanthroline | 0.3 | 1 | 245 | 3:05 | 9600 | 8.9 | 92.8 | 0.9 |
| EX 18 | PBT | CuI | 0.15 | 1,10-phenanthroline | 0.15 | 1 | 255 | 2:30 | 9500 | 6.2 | 94.6 | 0.8 |
| COMP EX 8 | PBT | CuI | 0.3 | not used | — | — | 245 | 3:05 | 9450 | 16.2 | 71.2 | 3.7 |
| COMP EX 9 | PBT | not used | — | not used | — | — | 245 | 3:05 | 9500 | 17.4 | 70.4 | 0.8 |
| COMP EX 10 | PBT | not used | — | 1,10-phenanthroline | 0.3 | — | 245 | 2:40 | 9600 | 18.0 | 69.5 | 0.8 |
| COMP EX 11 | PBT | not used | — | not used | — | — | 255 | 2:35 | 9400 | 28.8 | 68.4 | 0.8 |

Compared with the polybutylene terephthalate resin compositions obtained in Comparative Examples 8 to 11, the polybutylene terephthalate resin compositions obtained in Examples 17 and 18 according to the invention had the better values of hydrolysis resistance and haze.

The invention clamed is:

1. A polyester resin composition, comprising:
    a polyester resin that is obtained by polycondensation from a dicarboxylic acid or an ester-forming derivative thereof and a diol as main raw material; and
    a copper-containing compound and a nitrogen-containing chelate ligand having a nitrogen-containing heterocyclic structure or a tertiary amine structure that are mixed with the polyester resin;
    wherein
    0.001 to 0.3 mmol of the copper-containing compound is mixed on a copper atom basis relative to 100 g of the polyester resin, and
    a polyester solution obtained by dissolving 2 g of the polyester resin composition in 20 ml of a 3/2 (volume ratio) mixed solution oh phenol/ 1,1,2,2-tetrachloroethane has a haze of not higher than 2.3% that is measured by using a cell having an optical path of 20 mm.
2. The polyester resin composition according to claim 1, wherein 0.001 to 10 mmol of the nitrogen-containing chelate ligand is mixed relative to 100 g of the polyester resin.
3. The polyester resin composition according to claim 1, wherein the nitrogen-containing chelate ligand is mixed with copper atom of the copper-containing compound at a molar ratio (the nitrogen-containing chelate ligand/ copper atom of the copper-containing compound) of 0.001 to 4.
4. The polyester resin composition according to claim 1, wherein the copper-containing compound is at least one selected from the group consisting of an organic copper salt, an inorganic copper salt, a copper halide, a copper oxide and a copper hydroxide.
5. The polyester resin composition according to claim 1, wherein the nitrogen-containing chelate ligand is any of a compound having a partial structure of 2,2'-bipyridyl, a compound having a partial structure of 1,10-phenanthroline and a compound having a partial structure of N,N,N',N'-tetramethylethylenediamine.
6. The polyester resin composition according to claim 5, wherein the nitrogen-containing chelate ligand is either of 2,2'-bipyridyl and 1,10-phenanthrorine.
7. The polyester resin composition according to claim 1, wherein the polyester resin is at least one selected from the group consisting of polyethylene terephthalate, polypropylene terephthalate, polybutylene terephthalate and polyethylene naphthalate.
8. The polyester resin composition according to claim 1, wherein the polyester resin has a number-average molecular weight of 5000 to 100000.
9. The polyester resin composition according to claim 1, wherein the polyester resin has an acid value of not higher than 13 eq/t.
10. A method of producing the polyester resin composition according to claim 1, the method comprising:
    in a process of producing a polyester resin by performing esterification or transesterification of a dicarboxylic acid or an ester-forming derivative thereof and a diol, and subsequently performing polycondensation, mixing a copper-containing compound and a nitrogen-containing chelate ligand having a nitrogen-containing heterocyclic structure or a tertiary amine structure in any of the esterification, the transesterification or the polycondensation.

11. The method of producing the polyester resin composition according to claim 10, the method mixing 0.001 to 0.3 mmol of the copper-containing compound on a copper atom basis relative to 100 g of the obtained polyester resin.

12. The method of producing the polyester resin composition according to claim 10, wherein 0.001 to 10 mmol of the nitrogen-containing chelate ligand is mixed relative to 100 g of the obtained polyester resin.

13. The method of producing the polyester resin composition according to claim 10, wherein the nitrogen-containing chelate ligand is mixed with the copper-containing compound at a molar ratio of 0.001 to 4 with respect to the nitrogen-containing ligand and the copper atom of the copper-containing compound.

14. A polyester resin composition, comprising:

a polyester resin formed by polycondensation from a dicarboxylic acid and/or an ester-forming derivative thereof and a diol as main raw material;

a copper-containing compound; and a nitrogen-containing chelate ligand having at least one of a nitrogen-containing heterocyclic structure and a tertiary amine structure;

wherein 0.001 to 0.3 mmol of the copper-containing compound is mixed on a copper atom basis relative to 100 g of the polyester resin, and a polyester solution obtained by dissolving 2 g of the polyester resin composition in 20 ml of a 3/2 (volume ratio) mixed solution of phenol/ 1,1,2,2-tetrachloroethane has a haze of not higher than 2.3% that is measured by using a cell having an optical path of 20 mm.

* * * * *